United States Patent Office 2,903,740
Patented Sept. 15, 1959

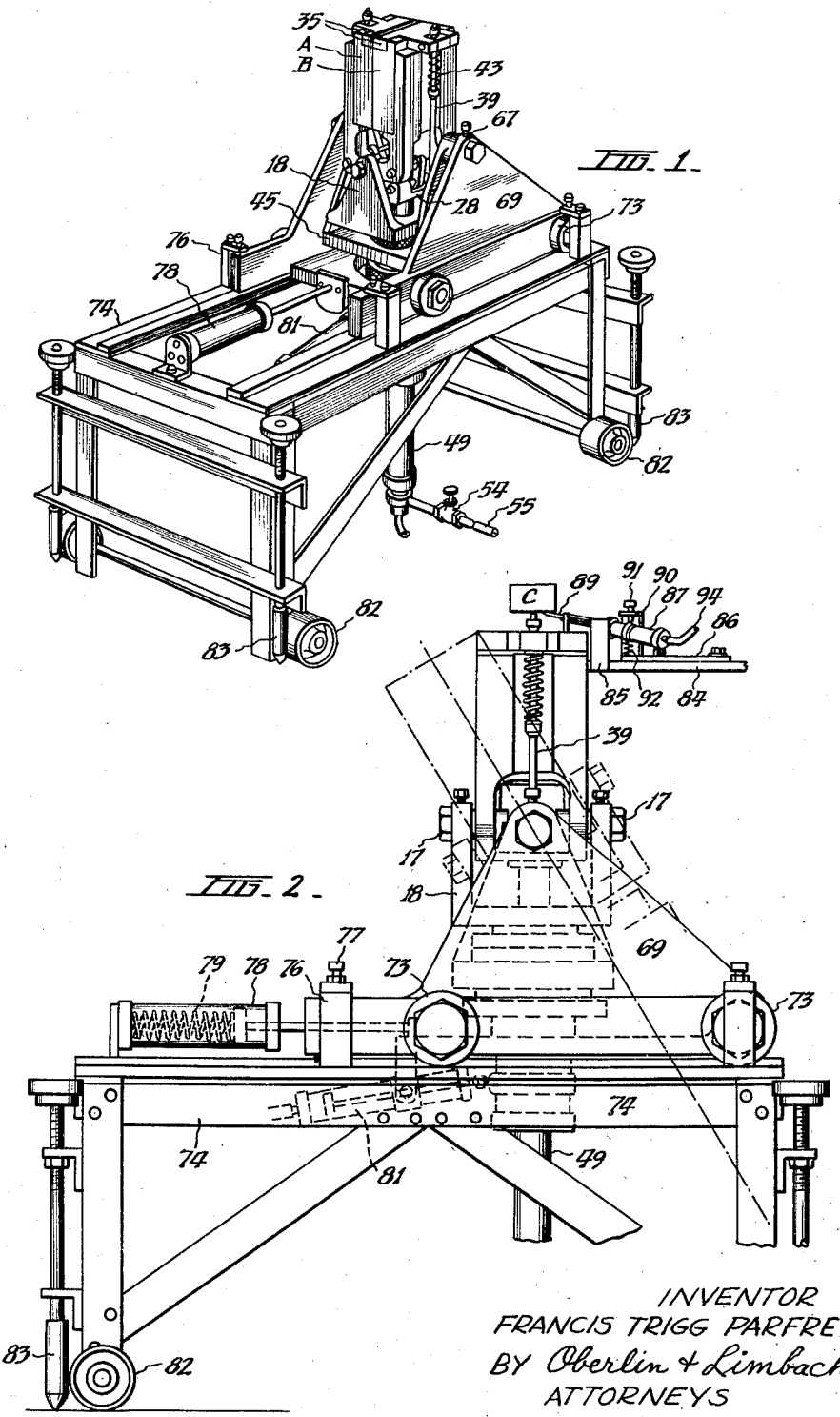

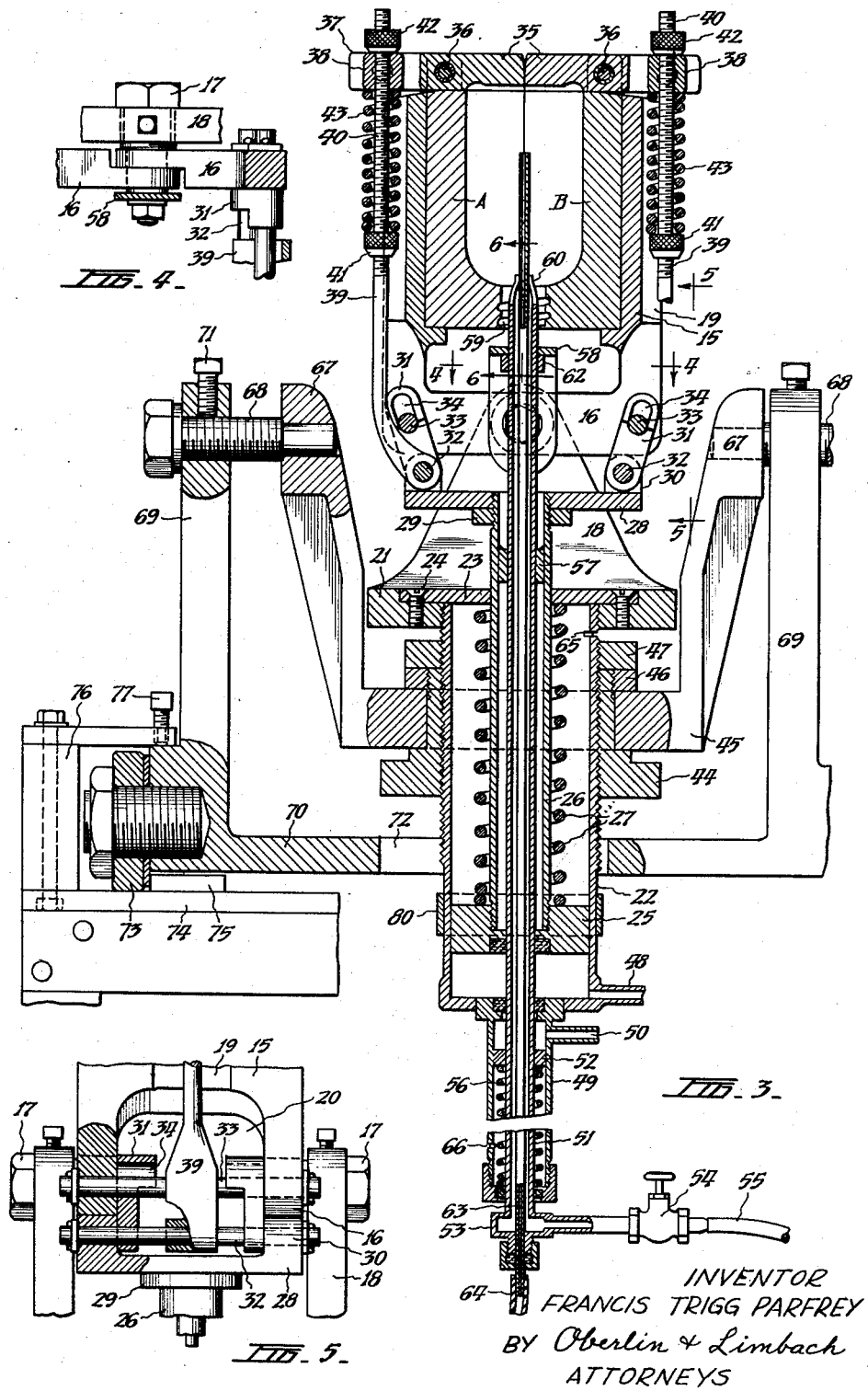

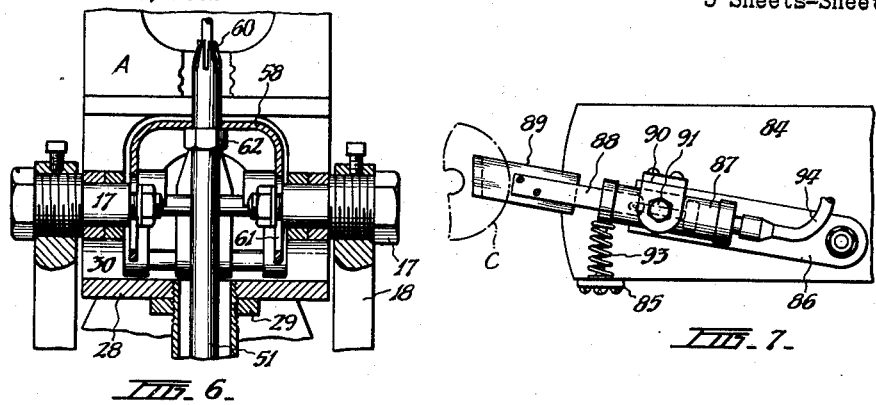
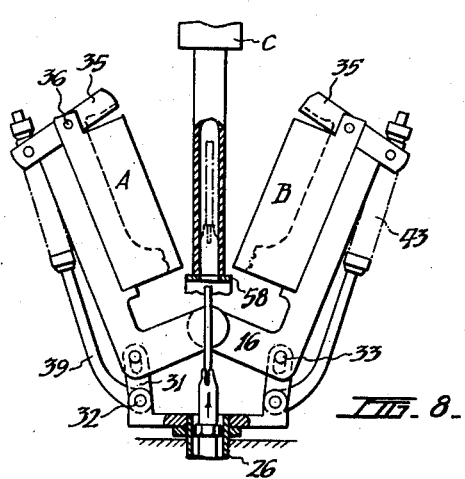
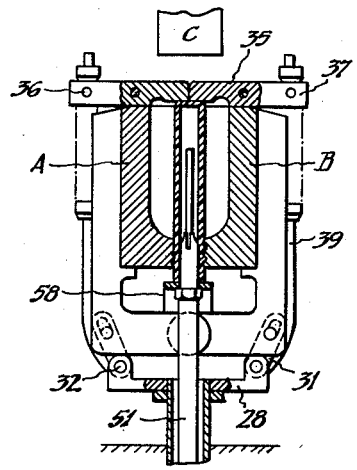
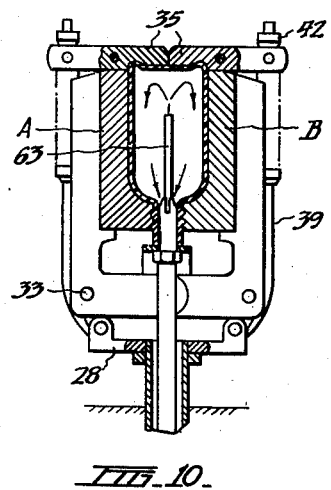
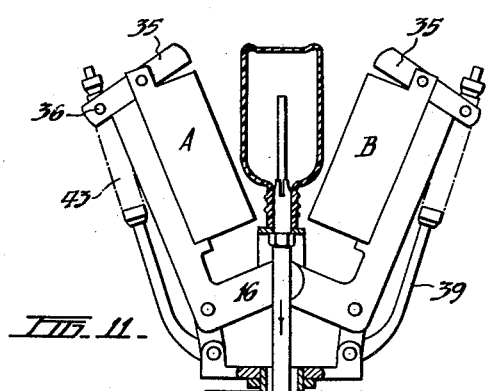

2,903,740

MEANS FOR FORMING HOLLOW ARTICLES

Francis Trigg Parfrey, St. Kilda, near Melbourne, Victoria, Australia

Application December 10, 1952, Serial No. 325,135

Claims priority, application Australia December 17, 1951

5 Claims. (Cl. 18—5)

This invention relates to a new and improved means for forming hollow articles, such as bottles, in thermoplastic synthetic materials such as polyvinyl chloride, polythene, butyrate and the like (hereinafter, for brevity, referred to as "plastics" or "plastic materials").

It has been previously proposed to make hollow articles, such as dolls, from plastics by a method providing for the production of the hollow articles one at a time from lengths of tubular plastic material, with a large part of the work being done or controlled manually. And although the method is quite effective it does not ensure a desired high rate of production without the necessity for employing considerable labour and providing a number of separate moulds or dies for the production of the articles.

It has also been proposed to provide a rotating table having a series of moulds or dies thereon, the tubular plastic material to be formed to a desired shape being inserted into a mould, then heated, expanded to the requisite shape, then cooled and finally ejected. In the performance of the several operations the table is rotated from station to station and the output of the machine is continuous—each mould having formed in it a single article and each formed article being ejected from its mould at a definite station. However, this process is not altogether satisfactory and, moreover, the apparatus required is relatively expensive. In addition, it is necessary to provide several moulds of the article to be formed and this can be relatively expensive—and the proportionate die cost of the article is increased by the necessity to provide more than one mould. In an alternative process, somewhat similar to the above, the tubular material to be moulded is extruded into the successive moulds, each mould is closed, then the material is blown to shape, allowed to cool, and finally ejected from the mould.

It is to be realized that in order to achieve a high rate of production in the automatic manufacture of bottles and/or other hollow articles from plastic material it is necessary to eliminate as far as possible all waiting time so that no operation is held up or delayed owing to the time taken for performing another operation in the series of operations required for the production of the desired article. For example, it is desirable that the process of extruding the plastic material be continued even though the blowing apparatus is not in position to receive the extruded plastic tubing. Furthermore, it is desirable to reduce as far as possible the time taken to cool the formed hollow article. In consideration of this aspect it must be mentioned that the material must be in a very hot and soft condition in order that it may be blown to the desired shape, and the material must be cooled in order that the formed article will possess sufficient rigidity, when it is removed from the machine, that it will not become permanently deformed.

Furthermore, it will be appreciated that if there be required but a single complete mould or die for the formation of the articles at a desired rate then the cost of production of the articles will be much lower than would be the cost if there were required, say, ten complete dies in order to achieve the same production rate. In addition, the initial cost of the machine or apparatus for making the articles has a bearing upon the cost of production as the depreciation of the machine must be charged against production.

This invention has been devised primarily with the object of providing an improved means for forming hollow articles—such as plastic bottles which will allow a relatively high rate of output without a correspondingly high labour cost, and yet will not necessitate a relatively high machine and initial die cost. A further object is to devise a manner of making plastic hollow-ware which will be more efficient than the methods previously proposed. Another object is to provide a process of and means for manufacturing hollow-ware of plastic material which will be conducive to a more rapid and economical production than has hitherto been possible, especially in short production runs, and a high flexibility in the use of the apparatus made according to the invention. An important object is to devise an improved method of and means for rapidly cooling the article after it has been formed to the requisite shape in the die. Another important object is to devise a machine for performing a sequence of operations in the production of plastic hollow-ware such that "waiting time" will be greatly reduced.

A feature devised with these and other objects in view is the step, in the method of forming hollow articles in plastic material, of blowing cooling fluid under pressure into a length of tubular plastic material (when said material is held in a die) so as to blow that material to the desired shape, and exhausting the fluid from within the formed hollow article so that there is a continuous flow of cooling fluid through the formed hollow article.

According to one aspect the method includes the steps of feeding a length of heated tubular plastic material above a mandrel, closing the parts of a moulding die about the plastic material so that one end of the plastic material is clamped about the mandrel and the other end is pinched closed, blowing fluid under pressure into the tubular plastic material so as to blow that material to the internal shape of the die, and exhausting the fluid from within the formed hollow article so that there is a continuous flow of fluid through the formed hollow article.

According to another aspect the method includes the steps of extruding tubular plastic material into an opened moulding die, inserting the end of a mandrel into the lower end of the tubular plastic material, closing the die about the plastic material so that the lower end of the plastic material is clamped about the mandrel and the upper end of the plastic material is closed, blowing fluid under pressure into the tubular plastic material so as to force that material to the internal shape of the die, cooling the formed hollow article, and ejecting the formed hollow article from the die.

The apparatus devised for carrying the method into effect includes a mounting for a moulding die, a hollow mandrel associated with the die mounting, the mandrel being so arranged that fluid under pressure may be forced through it into a length of tubular plastic material held within a die supported in the die mounting, and means for exhausting the fluid from within the tubular plastic material so that fluid may be caused to flow continuously through the plastic material to cool the formed hollow article.

The complete apparatus comprises a mounting for the parts of a die, die members in that mounting, means for opening and closing the die, means for moving the die mounting from a position below the extrusion nozzle of a plastic extrusion machine to a position disposed therefrom, an air injection nozzle or mandrel associated with the die mounting and adapted to discharge air under pressure into a tubular length of plastic material held within the die, means for exhausting the air from within the tubular material, means for ejecting the formed hollow article from the die and means for returning the die and the mandrel to initial position. The ejection means may include a mounting for the air injection nozzle such that when the die is opened the nozzle will move downwardly to enable the hollow article to fall or be readily removed from the injection nozzle.

A feature of the invention is the provision of means for effecting a continual flow of air under pressure into and out of the hollow article so as to provide for relatively rapid cooling of the plastic material. A further feature resides in the extrusion of the plastic material above, instead of about, the mandrel so that the material may be extruded when the mandrel is not in the "blow" position, thereby effecting a considerable saving in time in the performance of the several operational steps for the production of the formed hollow articles.

In order that the invention will be clearly understood and readily put into practical form I shall now describe, with reference to the accompanying sheets of illustrative drawings, a preferred construction of apparatus made according to the invention, and also the operation of the apparatus to perform the method I have devised for forming hollow articles of plastic materials. In these drawings:

Fig. 1 is a perspective view of the apparatus;

Fig. 2 is a side elevation, partly broken away, of the machine depicted in Fig. 1 and showing in addition cutter means for severing tubular plastic material at the mouth of an extrusion die;

Fig. 3 shows a vertical transverse section of portion of the apparatus, the cross-section being taken through the center-line of the die and die-operation mechanism;

Fig. 4 is a horizontal cross-sectional view, of portion of the apparatus, taken on the line and in the direction indicated by the arrows 4—4 in Fig. 3;

Fig. 5 illustrates the construction of portion of the apparatus as seen in the direction of the arrows and on the line 5—5 in Fig. 3, part of the view being shown in section for clarity of illustration;

Fig. 6 is a vertical cross-section through that part of the apparatus illustrated in Fig. 5, the cross-section being taken in the same direction as Fig. 5 but on the line 6—6 of Fig. 3;

Fig. 7 shows a plan view of the cutter by means of which the extruded plastic material is cut off below the extrusion nozzle;

Figs. 8, 9, 10 and 11 are diagrammatic views illustrating the sequence of operations in carrying into effect the method of this invention.

Referring initially to Figs. 2, 3, 4, 5 and 6, the moulding die consists of two principal parts indicated by the reference letters A and B. Each of these die parts is fastened to a bracket 15 of somewhat angle shape, and the two brackets 15 are pivotally mounted, near the ends of their lower arms 16, upon two bolts 17 fitted through the upper end portions of the sides of a channel or U-shaped mounting member 18, the two brackets 15 being mounted in such manner that the brackets may be moved pivotally apart to open the two die parts A and B. Each bracket 15 has a groove or channel 19 in the outer side of its upper arm and an opening 20 at about the angle or bend, the lower arm 16 being bifurcated (see particularly Fig. 5). The lower arms 16 of the brackets 15 are pivotally mounted on the bolts 17 in the manner depicted particularly in Fig. 4.

The mounting member 18 has a relatively wide base 21 which is screwed on to the upper end of an externally screw-threaded cylinder 22 of a pneumatic ram. The top plate 23 of the cylinder 22 is clamped tightly on to the top of the cylinder 22 and fastened to the base 21 by screws 24.

The piston 25 of the ram has connected to it a tubular piston rod 26 which extends upwardly through the top plate 23. A helical compression spring 27 is fitted about the tubular piston rod 26 so as to be adapted to press the piston 25 downwardly. At the upper end of the tubular piston rod 26 there is fastened a platform 28 which is locked in position on the tubular piston rod 26 by means of a lock nut 29. The platform 28 has, on its upper surface, several lugs 30 so spaced that they are located directly beneath the bifurcated lower arms 16 of the brackets 15, at about the bend or angle of said brackets. The lugs 30 are thus adapted to bear upon the undersides of the two brackets 15 so that when the platform 28 is raised by the action of the pneumatic ram it will press upwardly upon the brackets 15 and move said brackets pivotally to close the die parts A and B.

The platform is operatively connected to the brackets 15 by slotted links 31, the links 31 being pivotally mounted upon bars 32 which are fitted through the lugs 30 and engaging with parallel bars 33 fitted through the brackets 15 at about the angles or bends thereof. The upper end portions of the links 31 are slotted at 34 so that said links can move downwardly for a short distance relative to the bars 33 without inducing movement in said bars.

Each of the die parts A and B has, at its upper end, a top member 35 which is pivotally mounted upon a pin 36. Each of the top members has an outwardly extending bifurcated arm 37 to which is pivotally connected a block 38. A rod 39 is connected to each of the bars 32, and each rod 39 fits through the relative block 38, the rod 39 being partly accommodated for the major portion of its length in the groove or channel 19 in the outer side of the bracket 15. Each rod 39 is screw threaded at 40 and on the screw threaded portion is a knurled nut 41, an upper knurled nut 42 and a helical compression spring 43. By adjusting the position of the nut 41 on the rod 39 the pressure of the spring 43 may be varied and by adjusting the upper nut 42 the relative top member 35 may be set so that when the die parts A and B are in closed position the top members 35 will be correctly closed to constitute the top of the die.

When the platform 28 is moved downwardly the top members 35 will be opened instantly as there is a direct connection between the platform 28 and each top member 35, but the platform, by its movement, will not cause the die parts A and B to be opened pivotally until the platform 28 has moved such a distance that the slotted links 31 engage the bars 33 and cause the brackets 15 to move pivotally.

The cylinder 22 of the pneumatic ram is screwed into a sleeve member 44 which is fitted through the bottom portion of a somewhat U-shaped hanger bracket 45 and held in position by a nut 46 engaged upon its upper end. A lock nut 47 is screwed on to the cylinder 22 and operates to hold the cylinder firmly against rotational movement relative to the sleeve member 44. If required, the vertical height of the cylinder 22, and of the parts carried by it, may be adjusted relative to the bracket 45 by turning the sleeve member 44 after the nuts 46 and 47 have been slackened.

At the lower end of the cylinder 22 there is an air inlet pipe 48 by means of which air under pressure may be introduced into the lower portion of the cylinder 22. The pressure of air so introduced will cause the piston 25 to rise against the pressure of the spring 27. When the air is allowed to escape from the cylinder 22 the spring 27 will force downwardly the piston 25, as well as the tubular piston rod 26 and the parts carried thereby.

Fastened to the bottom of the cylinder 22 is a smaller cylinder 49 having an air inlet 50 near its upper end and an axial opening in its lower end. There is, moreover, an axial opening through the upper end of the cylinder 49 and lower end of the larger cylinder 22. An inner tubular piston rod or mandrel 51 is fastened to a piston 52 so as to be movable therewith, and said inner piston rod or mandrel 51 projects downwardly through the lower end of the cylinder 49, a gland being provided to seal the opening against excessive leakage of air. At the lower end of the inner tubular piston rod 51 is a member 53 to which is connected a pressure regulator valve 54 having an air exhaust tube 55 connected to it. A helical compression spring 56 is fitted about the tubular piston rod 51 within the cylinder 49, below the piston 52, so as to act to force the piston 52 and the inner piston rod 51 upwardly when the air pressure in the upper part of the cylinder 49 is released.

The tubular piston rod or mandrel 51 fits axially within the piston rod 26 and its upper end projects upwardly beyond the upper end of the piston rod 26, being held in axial relationship with the piston rod 26 by a bush 57 provided within the said piston rod 26. When the upper end of the inner piston rod or mandrel 51 is in the position as shown in Fig. 3 it projects upwardly through a stop member 58 of saddle shape—see Fig. 6—and into an opening 59 at the lower end of the composite die A, B. This opening 59 in the die A, B is provided for the purpose of forming the necks of the bottles to be moulded and as shown in the drawings the wall of the opening 59 is formed with screw threads so that the neck of the bottle formed in the die will be externally screw-threaded. The upper end of the mandrel 51 is slotted radially at 60 to permit free flow of air into the mandrel from a bottle held in the die parts A, B.

The stop member 58 has slots 61 formed in its side legs and said stop member 58 is mounted on the inner ends of the bolts 17, the height of the stop member relative to the lower end of the die A, B being adjustable to suit particular requirements. A nut 62 is engaged on the mandrel 51 below the stop member 58 and said nut limits the upward movement of the mandrel 51 relative to the die A, B. The downward movement of the mandrel 51 is limited by the limitations imposed on the downward travel of the piston 52 in the cylinder 49.

Fastened within the mandrel or tubular piston rod 51 is an air inlet pipe 63 having its lower end projecting through the lower end of said inner piston rod 51 and its upper end projecting upwardly beyond the upper end of said inner piston rod or mandrel 51. A flexible air supply tube 64 is connected to the lower end of the air inlet pipe 63, and the air inlet pipe and the inner piston rod or mandrel 51 are adapted to move linearly as a unit when the piston 52 is caused to move by air introduced into the second or smaller air cylinder 49 or by the pressure of the spring 56 when the air is permitted to flow from the cylinder 49.

The air inlet pipe 63 is so mounted within the mandrel 51 that the air flowing through said pipe 63 may, when the mandrel 51 is supporting a hollow article such as a bottle, be exhausted through slots 60 at the upper end of the mandrel 51 and thence through the space or passageway about the external portion of the air inlet pipe 63 and through the hollow mandrel 51. The pressure regulating valve 54 is so operated that the pressure of air within the hollow article may be maintained at a desired value whilst permitting a flow of air through the air inlet pipe 63, hollow article and mandrel 51.

The pneumatic cylinders 22 and 49 have air flow openings 65 and 66 respectively to permit the free flow of air out of or into that portion of each cylinder to which air under pressure is not introduced, thereby enabling the pistons 25 and 52, respectively, to operate in desired fashion.

The hanger bracket 45 has a boss 67 at the upper end of each of its arms and a supporting stud 68 fits in each of said bosses. These studs 68 are screwed through the upper ends of a pair of arms 69, which extend upwardly from a base member 70, in such manner that by turning the studs 68 the lateral location of the hanger bracket 45 relative to the arms 69 may be adjusted. Set screws 71 are provided to clamp the studs 68 in adjusted position. The base member 70 is slotted longitudinally at 72 so as to provide an opening in which the cylinder 22 will be permitted to swing longitudinally when the hanger bracket 45 is moved pivotally. Said base member 70 is mounted upon runners 73 adapted to travel on the upper surface of the machine frame 74. At the opposite sides of the machine frame 74 are guide members 75 which constrain the base member 70 to travel in a straight path, and outwardly of the guide members 75 are pedestals 76 which carry clamp screws 77 by means of which the base member 70 may be tightly clamped in set position relative to the machine frame 74. Mounted on the machine frame 74 is a hydraulic ram 78, which is connected to the base member 70, having in it a return spring 79. The ram 78 and spring 79 are used when it is desired to move the die A, B longitudinally in a linear path in the operation of the machine—as in the formation of large size bottles—but are not used if the base member 70 is required to be held in the one position during the operation of the machine.

Secured to the lower end portion of the pneumatic cylinder 22 is a clamp member 80 to which is pivotally connected the outer end of a ram which projects outwardly from a hydraulic cylinder 81 fastened pivotally to the machine frame 74. As hydraulic fluid is introduced into the cylinder 81 the ram will move either outwardly or inwardly so as to cause the hanger bracket 45 to tilt pivotally either forwardly or backwardly. The hydraulic mechanism is so arranged and mounted that when the ram is in its innermost position in the cylinder 81 the hanger bracket 45 and the die parts A and B are in a substantially vertical position. In an alternative arrangement and construction the hydraulic ram is replaced by a pneumatic ram—to speed up the operation of the apparatus—and spring means are provided to return the hanger bracket 45 to vertical position.

In order to provide for mobility of the machine the frame 74 is mounted upon wheels 82, and there are provided rod bearing members 83 which may be screwed downwardly to take the weight of the machine and thereby hold the frame 74 and apparatus mounted on it in fixed position.

Associated with the apparatus for forming the hollow article is the cutter mechanism depicted in Figs. 2 and 7. This mechanism includes a mounting platform 84 to which is fastened a side plate 85, and a base plate 86 is pivotally mounted on the platform 84. A pneumatic ram 87 is mounted on the base plate 86 and at the outer end of the piston rod 88 there is fitted a cutter blade 89. A bracket 90 is secured to the base plate 86 so as to provide a support for an adjusting screw 91 which bears downwardly upon the upper surface of the ram 87. The ram is pressed upwardly against the screw 91 by a compression spring 92, and a second spring 93 is mounted between the side plate 85 and the ram 87 so as to be adapted to press the ram and the base plate 86 away from the side plate. An air line 94 is connected to the ram 87 so as to provide for the supply of air under pressure to the ram to operate the cutter.

The cutter mechanism is adjusted, by means of the screw 91, so that the cutter blade 89 will travel across, and in contact with, the lower and of the extrusion die—denoted by the reference C. The cutter blade 89 is normally held in correct position, ready to cut the plastic material extruded from the extrusion die C, by the blowing die A, B and the sequence of operations is such that the blade 89 will cut the plastic material extruded from the die C; then, as the blowing die parts A, B are moved away from beneath the die C immediately the cut is made, the spring 93 will press the ram 87 sideways and the blade 89 will be moved to one side out of the way of the material being extruded from the die C. The blade 89 is subsequently retracted, and then returned to initial position ready for the next cutting operation when the blowing die A, B is returned to initial position.

The die parts A, B are so made that the die is adapted to be cooled by any suitable means, as by the flow of cold water or cold air. To obtain the most efficient cooling of the die, it is preferred to use cold water and the die parts A, B may be connected to a cold water supply in conventional manner.

The die parts A and B may, of course, be made to any particular desired internal shape required for the formation of any particular article.

The apparatus according to this invention is adapted to be mounted beneath the extrusion nozzle or die C of an extrusion machine, the extrusion nozzle or die being so arranged that it extrudes tubular plastic material in a downward direction. This moulding apparatus is mounted so that the tubular plastic material will be extruded directly over—but not necessarily about—the hollow mandrel 51 and said mandrel is made to fit within the lower end of said hollow plastic material. That is to say, the external shape of the mandrel 51 will be made to suit the internal size and shape required for the particular hollow article to be moulded.

The moulding apparatus is adapted to be operated so as to perform the following operations in the sequence stated. At the commencement of operations the tubular plastic material is extruded from the extrusion die C when the parts A and B of the moulding die are in opened-apart position—see Fig. 8—and the mandrel 51 is held in a substantially vertical position. The mandrel 51 is, at that stage, in its retracted position below the stop 58 so that the tubular plastic material is extruded directly over but not about the mandrel, the plastic material passing between the parts A and B of the moulding die. There are provided means—such as a photo-electric cell or a micro-switch—whereby, when a desired length of tubular plastic material has been extruded, automatic mechanisms are operated so that air pressure is released from the cylinder 49 and air under pressure is supplied to the cylinder 22, the mandrel 51 and the air inlet pipe 63 are raised to operative position by the spring 56, and the parts A and B of the moulding die are closed together—see Fig. 9. When the die parts A and B are closed the tubular plastic material is severed by the cutter blade 89.

With the closing of the die parts A and B the top members 35 pinch the upper end portion of the tubular plastic material so that the upper end of the tube is closed. Immediately the blowing or moulding die is closed the hydraulic ram 81 is operated so that the hanger bracket 45, and the mounting member 18, cylinders 22 and 49 and die parts A and B carried thereby are caused to pivot forwardly and, simultaneously, an air inlet control valve is operated so that cold air is blown through the injection nozzle 63 within the mandrel 51 so as to cause the tubular plastic material to be blown to the shape of the die—see Fig. 10. It will be understood that the die parts A and B are so made that when the parts of the die are closed together the lower end portion of the tubular plastic material is clamped tightly about the mandrel 51 and will thus be pressed to the desired external shape of that end of the hollow article. As the tubular plastic material is in a very soft condition, having just passed from the extrusion nozzle or die C of the plastic extrusion machine, it will be readily formed to shape by the pressure of the air blown through the nozzle 63. Furthermore it will be readily cut by the cutter blade 89.

The mandrel 51 is moved with the mounting member 18 so that after the die parts A and B are closed and the mounting member 18 swung forwardly the mandrel 51 will still project substantially axially into the die parts A and B and air under pressure will flow through the injection nozzle 63 passing within the formed hollow article held in the die and then out through the slots 60 at the upper end of the mandrel, through the mandrel 51 and pressure regulating valve 54. Thus, there is provided a constant flow of cool air through the interior of the formed hollow article so as to effect a relatively rapid cooling of said hollow article, the air within the hollow article being maintained at a desired pressure to ensure that the hollow article is maintained at its desired shape.

After a short interval of time, during which the formed hollow article is cooled sufficiently so that it will retain its shape after removal from the die parts A and B, the pressure of air within the cylinder 22 is released so that the spring 27 forces the piston 25 downwardly, the tubular piston rod 26 is retracted relative to the mounting member 18, and the die parts A and B are opened apart to permit the formed hollow article to be removed therefrom—see Fig. 11. Air under pressure is forced into the cylinder 49 so as to cause the piston 52 to move downwardly, thereby retracting the mandrel 51 and air pipe or nozzle 63 to a position below the stop 58. The formed hollow article is then not supported and as the apparatus is inclined from the vertical the formed article will fall off the stop 58 into a suitable receptacle. Then the hydraulic pressure in the cylinder 81 is released so that the ram piston is retracted and the hanger bracket 45, mounting member 18 and apparatus carried thereby is returned to vertical position with the mandrel 51 directly beneath the plastic material which has been extruded from the extrusion die C during the performance of the blowing, cooling and ejection operations on the preceding length of tubular plastic material. The mandrel 51 is then raised, the die parts A and B closed, and the sequence of operations continued for the production of the next hollow article.

There are preferably provided automatic timing means for controlling the operations of the mechanism so that the several operations will be performed in a desired sequence and at a desired timing. Any suitable timer or control devices may be employed for this apparatus. Alternatively, the operations of the machine may be controlled manually.

If it be desired to form relatively long hollow articles, when the time required for extrusion of the tubular plastic material is relatively long in comparison with the time required for blowing, cooling and ejecting the formed hollow article, then instead of tilting the die-supporting apparatus so as to move the die from beneath the extrusion die C the apparatus may be moved linearly by the ram 78. When this is to be done the ram 81 is disconnected from the clamping member 80 and the ram 78 is connected to the hydraulic fluid supply instead of the ram 81. The sequence of operations will be the same save that the apparatus will be moved linearly instead of being tilted.

The operation of cutting the extruded plastic material may be performed immediately as the die parts A and B are closed, or during the tilting operation. The cycle of operations may be initiated by means such as a photo-electric cell, or a micro-switch, or by other suitable means, the photo-electric cell or other means being adapted to be operated when the lower end of the tubular plastic material reaches a pre-determined position within the die parts A and B so that an exact desired length of extruded material will be cut off. The measuring devices may be mounted so that the length of material to be severed may be regulated—that is to say, if it be required to cut off five inches of tubular material, then the photo-electric cell or other devices may be adjusted relative to the extrusion die so that the measuring devices will operate to cut off five inches of tubular material.

If desired, there may be provided means for applying cool air over the outer surface of the formed hollow article after the parts of the moulding die have been opened apart so as to ensure a relatively thorough and rapid cooling of the article. There may also be provided means for trimming and finishing the formed article. Such means may include a cutter or pincer members adapted to register with or grip the upper end of the formed hollow article and cut off the part formed by closing together the end of the tubular material, and there may also be provided a second cutter to trim the lower end of the formed article. The lower cutter may be adapted to rotate about the mandrel.

The mandrel may be so made that collars of requisite external diameter may be fitted to it, the collars being adapted to suit the size of the neck portion of the hollow article to be formed, so that the one mandrel may be used for the formation of hollow articles of different neck size.

This machine requires but a single die for use with the mounting member and this die is used to form each article. This is a distinct advantage as the die cost is reduced and it enables experimental work to be conducted at a relatively low cost. Furthermore, the initial cost for setting up for small runs of articles will be greatly reduced.

The extrusion die may have several extrusion orifices which may be of different shapes and sizes. In such a case there may be provided a number of separate machines for moulding hollow articles, one for use with each extrusion orifice. For example, if the extrusion die has four orifices, then there will be provided four machines and each machine may be adapted to produce a different article. Consequently, the one extrusion machine may be used for the production of a quantity of different articles simultaneously, or there may be obtained a four-fold production of the one article, if so desired. This flexibility in the use of the apparatus according to the invention is very important when production is required in relatively small runs. Also, if there be required a continuous output, but in relatively small quantities such as could be effected by the use of a single machine, then there may be used an extrusion machine having a small capacity and having but a single extrusion die so that there is a continuous output from the machine to comply with the demand for the formed articles. And then, if there be a sudden increase in the demand, an additional machine or machines may be used in conjunction with an extrusion machine having a larger capacity so as to fulfill the supply requirements. This mode of operation has definite advantages when compared with the continuous use of a machine having a large capacity but operating to provide a relatively small output, as the cost of operating such a large machine, even when its output is reduced, is still relatively large. In short, as the production requirements alter so may the apparatus be altered to suit those requirements. However, it will be understood that each moulding machine may be associated with its own particular extrusion machine instead of several moulding machines for each extrusion machine.

As an alternative arrangement two sets of dies may be fitted to the hanger bracket 45 in V-arrangement, the controls being so arranged that when one hollow article is being cooled the other die will be used for the formation of another article.

It will be found in use that a machine constructed according to my invention will be very efficient in operation whilst being conducive to economy of production and to a high rate of continuous output of formed hollow articles. It will be appreciated that apparatus according to the invention may be modified to suit particular requirements and to incorporate additional devices necessitated in the development of the machine but all such modifications as come within the scope of the appended claims are to be deemed as being included within the ambit of the invention.

I claim:

1. Apparatus for forming a closed-end hollow article including a die formed of complementary parts adapted for movement from an open to a closed position to receive a work blank and to define in such closed position a blowing chamber having a single outlet opening, a mandrel of concentric tubes adapted for longitudinal movement toward the die parts, means responsive to such longitudinal movement to move said die parts to such closed position and dispose the single outlet opening about said mandrel, and means to supply fluid under pressure through one of said concentric tubes while withdrawing fluid from the other tube.

2. Apparatus for forming a closed-end hollow article including a die formed from complementary sections adapted for reciprocatory movement from an open to a closed position to define in such closed position a blowing chamber having a single outlet, means for supplying a hollow work blank within the space defined by said closed position, a mandrel of concentric tubes adapted for reciprocatory axial movement toward and away from the die sections, means responsive to such axial movement toward the die sections to move said sections to such closed position and dispose the single outlet opening about said mandrel to define therewith an outlet portion of the hollow article to be formed, and means to supply fluid under pressure through one of said concentric tubes while withdrawing fluid from the other tube and at a rate differential sufficient to form the work blank to the shape of such blowing chamber.

3. Apparatus for forming a closed-end hollow article including a die formed from complementary sections, means to support and move the die sections from an open to a closed position to define in such closed position a blowing chamber, said die sections having end members at adjacent ends adapted to abut against one another and close off that end only of the blowing chamber, means for supplying a hollow work blank within the space defined by said closed position, a mandrel of concentric tubes adapted for reciprocatory axial movement toward and away from the die sections, means responsive to such axial movement toward the die sections to move said sections to such closed position and cause the end members of the die sections to sever the work blank at that end while disposing the opposed open end of the blowing chamber about said mandrel, such open end and said mandrel thereby forming an outlet portion of the hollow article to be formed, and means to supply fluid under pressure through one of said concentric tubes while withdrawing fluid from the other tube and at a rate differential sufficient to form the work blank to the shape of such blowing chamber while simultaneously cooling the blank during the blowing thereof.

4. Apparatus for forming a succession of closed-end hollow articles with a single die including a platform adapted for raising and lowering, a die formed of complementary sections pivotally mounted on the platform, means responsive to the raising and lowering of the platform to reciprocate the die sections between open and closed positions to define in such closed position a blowing chamber, end plates pivotally mounted on adjacent ends of said die sections and responsive to movement thereof to such closed position to pivot into abutting relation with each other and close off that end of the blowing chamber, means for supporting a hollow work blank within the space defined by said closed position, a mandrel of concentric tubes adapted for reciprocatory axial movement toward and away from the die sections, means responsive to such axial movement toward the die sections to move said die sections to such closed position and cause the end members of the die sections to sever the work blank at that end while disposing the opposed open end of the blowing chamber about said mandrel, such open end and said mandrel thereby forming an outlet portion of the hollow article to be formed, means to supply fluid under pressure through one of said concentric tubes while withdrawing fluid from the other tube to provide a continuous cooling flow through the work blank within the blowing chamber, and means operative on said mandrel for controlling the flow of fluid therethrough to provide sufficient fluid pressure within the work blank to form said blank before said cooling rigidifies said blank.

5. Apparatus for forming a succession of closed-end hollow articles with a single die including a platform adapted for raising and lowering, a die formed of complementary sections pivotally mounted on the platform, means responsive to the raising and lowering of the platform to reciprocate the die sections between open and closed positions to define in such closed position a blowing chamber, end plates pivotally mounted on adjacent ends of said die sections and responsive to movement thereof to such closed position to pivot into abutting relation with each other and close off that end of the blowing chamber, means for supplying continuous length tubular plastic material within the space defined by said closed position, a stop supported below the open end of the blowing chamber against which said tubular material abuts, said stop being perforate, a mandrel of concentric hollow tubes adapted for reciprocatory axial movement through said stop and toward and away from the die sections, means responsive to such axial movement toward the die sections to move said sections to such closed position and cause the end members of the die sections to sever the work blank at that end while disposing the opposed open end of the blowing chamber about said mandrel, such open end and said mandrel thereby forming an outlet portion of the hollow article to be formed, the ends of said concentric tubes within the blowing chamber being substantially separated from each other, and means to supply fluid under pressure through the longer of said tubes while extracting it through the other of said tubes to provide a continuous cooling flow through the work blank within the blowing chamber, and means operative on said mandrel for controlling the flow of fluid therethrough to provide sufficient fluid pressure within the work blank to form said blank before the cooling rigidifies it.

References Cited in the file of this patent

UNITED STATES PATENTS

| | | |
|---|---|---|
| 2,009,793 | Sanchez-Vello | July 30, 1935 |
| 2,150,017 | Barnard | May 7, 1939 |
| 2,167,724 | Murphy et al. | Aug. 1, 1939 |
| 2,180,737 | Hess | Nov. 21, 1939 |
| 2,288,454 | Hobson | June 30, 1942 |
| 2,349,177 | Kopitke | May 16, 1944 |
| 2,348,738 | Hofmann | May 16, 1944 |
| 2,359,216 | Hofmann et al. | Sept. 26, 1944 |
| 2,810,934 | Bailey | Oct. 29, 1957 |

FOREIGN PATENTS

| | | |
|---|---|---|
| 852,609 | Germany | Oct. 16, 1952 |
| 310,421 | Great Britain | Feb. 27, 1930 |
| 670,716 | Great Britain | Apr. 23, 1952 |

OTHER REFERENCES

Bailey: "Blow Molding" in Modern Plastics, vol. 22 (April 1945), pp. 127–133, 198, and 200.

"The Blowing of Plastics" in Modern Plastics, vol. 21, No. 2 (October 1943), pp. 96 and 97, published by Modern Plastics, Inc., Easton, Pa.